Patented Sept. 2, 1952

2,609,273

UNITED STATES PATENT OFFICE 2,609,273

NITROUS OXIDE PRODUCTION

Frederick R. Balcar, Stamford, Conn., assignor to Air Reduction Company, Inc., New York, N. Y., a company of New York No Drawing. Application January 9, 1948, Serial No. 1,481

4 Claims. (Cl. 23—158)

This invention relates to a method for the production of nitrous oxide by the thermal decomposition of ammonium nitrate.

In the production of nitrous oxide by the method which is generally used, ammonium nitrate is charged into a retort or reactor which is then externally heated until the salt is at a temperature of about 250° C., so that the then molten salt decomposes into water, nitrous oxide and impurities which are principally nitrogen and higher oxides of nitrogen. The temperature of the reaction mass is controlled manually by varying the gas supply to the external heaters and by pouring water over the outside of the retort when rapid cooling is necessary. The reaction involved in the foregoing method is monomolecular, and consequently the rate of nitrous oxide production is dependent upon the temperature and upon the mass of the ammonium nitrate being decomposed.

There are also a number of undesirable side reactions which produce the impurities, and the extent to which these reactions take place is largely a function of the uniformity of the reaction temperature. A very rapid increase in temperature over the range of only a few degrees can introduce a considerable amount of impurities into the product, and, if the temperature fluctuation is very sharp so as to induce considerable local overheating, explosion of the entire mass may result. In order to minimize the explosion hazard, the operating temperature of the retort is commonly maintained at a temperature lower than the compatible with maximum rate of production of nitrous oxide. Furthermore, a lower reaction temperature is used at the start of the operation when a full charge of molten ammonium nitrate is present in the retort, somewhat higher temperatures being used when almost all the charge has been decomposed. As a result of these variations in the reaction mass and in the temperature thereof, the present aforementioned batchwise process produces nitrous oxide of varying purity at a varying rate, both of which variations make for reduced economy in the operation of the condensers and of the purification system.

An additional hazard is involved in the aforementioned process in that relatively large amounts of ammonium nitrate must be melted at the start of the operation. Severe explosions have been known to take place, such explosions having been attributed to the development of "hot spots" caused by local overheating.

It is therefore the primary object of the present invention to provide an improved method for the production of nitrous oxide by the thermal decomposition of ammonium nitrate, such method being characterized by a high rate of nitrous oxide production per unit mass of ammonium nitrate being decomposed, by a reduced tendency to localize heating of the reaction mass and consequently reduced explosion hazard, and by the excellent purity of the product produced.

The foregoing and other objects are accomplished in accordance with the method of the present invention by passing an aqueous solution of ammonium nitrate in heat-exchange relationship to a mass of substantially anhydrous molten ammonium nitrate maintained at a temperature sufficiently high to effect a thermal decomposition thereof to nitrous oxide, for a length of time sufficient to produce substantial thermal equilibrium, that is, a substantial equalization of the temperature, between the feed at the point where it is introduced into the molten ammonium nitrate and the molten ammonium nitrate, and thereafter introducing the heated feed beneath the surface of the molten ammonium nitrate.

In practicing the process just indicated, there was employed as a reactor an aluminum vessel approximately 6 inches in diameter and 10 inches in height, equipped with a feed line, a gas outlet line and a thermocouple well. The reactor was immersed in a suitable bath, the temperature of which was controlled at the desired level by a thermocouple inserted in the bath and by a suitable controller. The feed line was a ½ inch by 15 inch aluminum tube which entered the reactor through the top thereof and passed beneath the surface of the molten ammonium nitrate which was later prepared in the reactor. The feed line had sufficient length to permit the establishment of a temperature equilibrium between the aqueous ammonium nitrate feed and the molten ammonium nitrate, and had its outlet near the bottom of the reactor. The container and pipe line for the feed solution were equipped with means for warming the feed solution, so that solidification of the concentrated ammonium nitrate solution would not occur prior to its introduction into the reactor. The concentrated ammonium nitrate feed solution was continuously introduced into the reactor by means of a suitable pump, the rate of flow of the feed being determined by the change in weight of the container of the feed solution. Flow meters were also provided in the feed line for convenience in operation. The gas outlet line was connected to a water-cooled condenser provided with a receiver to collect the water leaving the reactor. The gas from the condenser passed through a meter, and provision was made for collecting samples of the gas for analysis.

Operation of the process was started by filling the retort with from 7 to 8 lbs. of an 80% aqueous solution of ammonium nitrate, and then heating the solution to the decomposition temperature of the ammonium nitrate. The feed solution was then started, and the feed rate and the bath temperature were regulated so as to maintain the desired temperature and liquid level within the reactor. Readings were made of the volume of the gas produced, the weight of the condensate collected and the temperatures at various points in the system. Gas samples were taken at frequent intervals and were analyzed.

The following table contains data obtained in two representative runs which were made using the apparatus and method just described.

Table

| Concentration of Ammonium Nitrate Feed Solution percent by weight | Reaction Temperature °C. | Decomposition Rate Lbs. $NH_4NO_3$ per hour | Average Retort Contents Lbs. $NH_4NO_3$ | Gas Production C. F. H. at standard conditions | Nitrous Oxide in Gas percent by volume |
|---|---|---|---|---|---|
| 80 | 275 | 11.6 | 7.5 | 52.1 | 97.6 |
| 80 | 265 | 5.5 | 7.5 | 24.8 | 97.5 |

Various modifications may be made in the specific procedures just described. Thus, although an 80% aqueous solution of ammonium nitrate was employed as the feed in the two specific runs described, solutions containing from about 50 to about 90% by weight of ammonium nitrate may also be utilized. Furthermore, although decomposition temperatures of 265 and 175° C. are shown in the table, such temperatures are not critical. The decomposition temperatures which are customarily employed in the art of producing nitrous oxide from ammonium nitrate may be used in practicing the present method. Such temperatures are generally within the range from about 225 to about 280° C., with temperatures from about 260 to about 280° C. being preferred since they result in the production of nitrous oxide at a higher rate. Finally, it is advisable in practicing the present method that the heated feed and molten ammonium nitrate being decomposed be directly contacted in the lower half of the reactor vessel. In practicing the present method, the rate of feed and the heat input into the reaction mass are adjusted in known manner to maintain the level of the contents in the reaction vessel and also the reaction temperature substantially constant. Any of the means customarily employed in the art may be used for this purpose.

The method herein described is characterized by a wide variety of important practical advantages. Thus, by using an aqueous solution of ammonium nitrate to feed the reactor continuously, the need for the melting of large quantities of solid ammonium nitrate is eliminated, and the operation is performed without this hazard. Furthermore, the agitation provided by the contacting of the feed stream with the decomposing molten ammonium nitrate is far more vigorous than that supplied by ordinary means and avoids the possibility of contaminating the reaction mass with lubricants. In this connection, lubricants are known to have caused disastrous explosions. Moreover, in effecting the described method, the temperature of the reaction mass may be easily controlled by the introduction of water into the feed line, when the reaction becomes too vigorous. Such method of reaction control is particularly advantageous in that no contaminant is introduced into the product, since water itself is a product of the reaction. Also, the presence of the water of solution in the output gases tends further to dilute and cool the ammonia and nitric acid in the free space of the reactor. Since these gases tend to react at the usual reactor temperatures to form nitrogen, an impurity which can not easily be removed from the nitrous oxide, such dilution of these gases tends to maintain a higher product purity at reaction temperatures higher than those generally in use.

I claim:

1. The method for the production of nitrous oxide which comprises passing a feed which consists essentially of an aqueous solution of ammonium nitrate in indirect heat-exchange relationship to a mass of substantially anhydrous molten ammonium nitrate maintained at a temperature sufficiently high to affect a thermal decomposition of the molten ammonium nitrate to nitrous oxide, maintaining the feed in indirect heat-exchange relationship with the molten ammonium nitrate for a length of time sufficient to bring it to substantially the same temperature as the molten ammonium nitrate, introducing the thus heated feed beneath the surface of the molten ammonium nitrate, and adjusting the proportion of water in the feed to regulate the temperature of the mass of molten ammonium nitrate.

2. The method for the production of nitrous oxide defined in claim 1 in which the aqueous feed solution of ammonium nitrate is introduced into the molten mass of ammonium nitrate near the bottom thereof.

3. The method for the production of nitrous oxide defined in claim 1 in which the molten ammonium nitrate is maintained at a temperature between 225° and 280° C.

4. The method for the production of nitrous oxide defined in claim 3 in which the aqueous feed solution contains from 50% to 90% by weight of ammonium nitrate.

FREDERICK R. BALCAR.

REFERENCES CITED

The following references are of record in the file of this patent:

UNITED STATES PATENTS

| Number | Name | Date |
|---|---|---|
| 1,499,544 | Miller et al. | July 1, 1924 |
| 1,896,945 | Friederich | Feb. 7, 1933 |
| 2,111,276 | Castner et al. | Mar. 15, 1938 |
| 2,217,263 | Waterman et al. | Oct. 8, 1940 |
| 2,425,582 | Vingee | Aug. 12, 1947 |

FOREIGN PATENTS

| Number | Country | Date |
|---|---|---|
| 441,586 | Great Britain | Jan. 22, 1936 |
| 276,069 | Germany | May 24, 1913 |